United States Patent
Bang et al.

(10) Patent No.: US 12,047,173 B2
(45) Date of Patent: Jul. 23, 2024

(54) METHOD FOR RECEIVING ACK FRAME IN WLAN SYSTEM AND APPARATUS THEREFOR

(71) Applicant: LG ELECTRONICS INC., Seoul (KR)

(72) Inventors: Saehee Bang, Seoul (KR); Jinmin Kim, Seoul (KR); Kiseon Ryu, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 812 days.

(21) Appl. No.: 17/050,827

(22) PCT Filed: May 7, 2019

(86) PCT No.: PCT/KR2019/005415
§ 371 (c)(1),
(2) Date: Feb. 11, 2021

(87) PCT Pub. No.: WO2019/216616
PCT Pub. Date: Nov. 14, 2019

(65) Prior Publication Data
US 2021/0176009 A1 Jun. 10, 2021

(30) Foreign Application Priority Data
May 8, 2018 (KR) .......... 10-2018-0052494
May 29, 2018 (KR) .......... 10-2018-0061059

(51) Int. Cl.
*H04W 4/00* (2018.01)
*H04L 1/1607* (2023.01)
(Continued)

(52) U.S. Cl.
CPC .......... *H04L 1/1621* (2013.01); *H04L 5/1469* (2013.01); *H04W 72/0446* (2013.01); *H04W 72/23* (2023.01); *H04W 84/12* (2013.01)

(58) Field of Classification Search
CPC ... H04W 28/04; H04W 72/04; H04W 72/042; H04W 88/08; H04W 28/08;
(Continued)

(56) References Cited

U.S. PATENT DOCUMENTS 7,881,271 B2 * 2/2011 Oishi ............... H04W 8/04
455/450
2010/0014448 A1 * 1/2010 Wentink ............ H04L 1/1685
370/311
(Continued)

OTHER PUBLICATIONS

PCT International Application No. PCT/KR2019/005415, International Search Report dated Aug. 6, 2019, 2 pages.
(Continued)

*Primary Examiner* — Phuongchau Ba Nguyen
(74) *Attorney, Agent, or Firm* — LEE, HONG, DEGERMAN, KANG & WAIMEY

(57) ABSTRACT

A method and an apparatus for receiving an ACK frame in a WLAN system are proposed. Specifically, a first STA transmits a plurality of first MPDUs in a first transmitting TDD slot to a second STA. The first STA receives a first ACK frame for the plurality of first MPDUs from the second STA in a first receiving TDD slot. The first STA transmits a second MPDU to the second STA in a second transmitting TDD slot. The first STA receives a second ACK frame for the second MPDU from the second STA in a second receiving TDD slot.

20 Claims, 21 Drawing Sheets

(51) Int. Cl.
*H04L 5/14* (2006.01)
*H04W 72/0446* (2023.01)
*H04W 72/23* (2023.01)
*H04W 84/12* (2009.01)

(58) Field of Classification Search
CPC ... H04W 28/084; H04W 36/22; H04W 72/12; H04W 72/0446; H04W 72/23; H04W 84/12; H04L 5/0007; H04L 1/1621; H04L 5/1469; H04L 1/1614; H04L 1/1854; H04L 5/0055
See application file for complete search history.

(56) References Cited

U.S. PATENT DOCUMENTS

| | | | |
|---|---|---|---|
| 2011/0134900 A1* | 6/2011 | Liu | H04L 5/0032 370/392 |
| 2012/0213308 A1* | 8/2012 | Merlin | H04L 1/1621 375/295 |
| 2014/0036895 A1 | 2/2014 | Liu et al. | |
| 2015/0124689 A1 | 5/2015 | Merlin et al. | |
| 2015/0146648 A1* | 5/2015 | Viger | H04L 1/1685 370/329 |
| 2016/0330007 A1* | 11/2016 | Cherian | H04L 1/1854 |
| 2016/0374081 A1 | 12/2016 | Asterjadhi et al. | |
| 2018/0254861 A1* | 9/2018 | Cherian | H04L 1/1854 |
| 2019/0052407 A1* | 2/2019 | Son | H04L 1/1854 |

OTHER PUBLICATIONS

Qualcomm et al., "Ack/BA for mmWave Distribution Networks," IEEE 802.11 Documents, IEEE 802.11-17/1647r0, Nov. 6, 2017, 14 pages.

Qualcomm et al., "Draft text of Ack/BA transmission in mmWave Distribution Networks, " IEEE 802.11 Documents, IEEE 802.11-18/0069r1, Jan. 15, 2018, 10 pages.

* cited by examiner

FIG. 9

| CH 1 | L-STF | L-CE | L-Header | ay Header A | ay STF | ay CE | ay Header B | ay payload |
|------|-------|------|----------|-------------|--------|-------|-------------|------------|
|      | GF-STF | GF-CE | | | | | | |
| CH 2 | L-STF | L-CE | L-Header | ay Header A | | | | |

(L: Legacy, GF: Gap Filling, ay: 802.11ay)

METHOD FOR RECEIVING ACK FRAME IN WLAN SYSTEM AND APPARATUS THEREFOR

CROSS-REFERENCE TO RELATED APPLICATIONS

This application is the National Stage filing under 35 U.S.C. 371 of International Application No. PCT/KR2019/005415, filed on May 7, 2019, which claims the benefit of earlier filing date and right of priority to Korean Application Nos. 10-2018-0052494, filed on May 8, 2018, and 10-2018-0061059, filed on May 29, 2018, the contents of which are all hereby incorporated by reference herein in their entirety.

BACKGROUND

Field

The present specification relates to a technique for transmitting and receiving a signal in a wireless local area network system and, more particularly, to a method and a device for receiving an ACK frame in a TDD scheduling scheme.

Related Art

A standard for the wireless LAN technology is being developed as an Institute of Electrical and Electronics Engineers (IEEE) 802.11 standard. IEEE 802.11a and b use an unlicensed band in 2.4. GHz or 5 GHz. And, IEEE 802.11b provides a transmission rate of 11 Mbps, and IEEE 802.11a provides a transmission rate of 54 Mbps. And, IEEE 802.11g provides a transmission rate of 54 Mbps by applying orthogonal frequency-division multiplexing (OFDM). IEEE 802.11n provides a transmission rate of 300 Mbps on 4 spatial streams by applying multiple input multiple output-OFDM (MIMO-OFDM). The IEEE 802.11n supports a channel bandwidth of up to 40 MHz, and, in this case, the IEEE 802.11n provides a transmission rate of 600 Mbps.

The above-described wireless LAN (WLAN) standard was previously defined as the IEEE 802.11ac standard, which uses a maximum bandwidth of 160 MHz, supports 8 spatial streams, and supports a maximum rate of 1 Gbit/s. And, discussions are now being made on the IEEE 802.11ax standardization.

Meanwhile, the IEEE 802.11ad system regulates a capability enhancement for an ultra-high speed throughput in a 60 GHz band, and, for the first time, in the above-described IEEE 802.11ad system, discussions are being made on an IEEE 802.11ay for adopting channel bonding and MIMO techniques.

SUMMARY

The present specification proposes a method and a device for receiving an ACK frame in a wireless local area network (WLAN) system.

The present specification proposes a method and a device for receiving an ACK frame in a TDD scheduling scheme.

An embodiment proposes a method for efficiently providing ACK information in a TDD scheduling scheme in an 802.11ay system.

A first station (STA) transmits an A-MPDU or a single MPDU to a second STA.

The first STA receives a block ACK frame or an ACK frame from the second STA.

Specific operations of the first STA and the second STA will be described as follows.

The first STA transmits a plurality of first MAC protocol data units (MPDUs) to the second STA in a first transmission TDD slot.

The first STA receives a first ACK frame of the plurality of first MPDUs from the second STA in a first reception TDD slot.

The first STA transmits a second MPDU to the second STA in a second transmission TDD slot.

The first STA receives a second ACK frame of the second MPDU from the second STA in a second reception TDD slot.

The plurality of first MPDUs, the second MPDU, the first ACK frame, and the second ACK frame are transmitted and received in a service period based on time division duplex (TDD).

The SP includes the first and second transmission TDD slots and the first and second reception TDD slots.

The plurality of first MPDUs is consecutively transmitted in a plurality of TDD slots within the first transmission TDD slot.

Each of the plurality of first MPDUs may be an aggregated-MPDU (A-MPDU), and the second MPDU may be a single MPDU. The A-MPDU is an MPDU in which a plurality of MPDUs is aggregated, and the single MPDU is an MPDU in which only one MPDU is included.

The first ACK frame may be a block acknowledgement (BA) frame including information on whether each of the plurality of first MPDUs is successfully received, and the second ACK frame may be a normal ACK frame. The BA frame may be configured in a bitmap and may be indicate whether each of the plurality of first MPDUs is successfully received.

A last MPDU among the plurality of first MPDUs may include a block ACK request (BAR).

The last MPDU may not be transmitted in a last TDD slot of the first transmission TDD slot.

Each of the plurality of first MPDUs may be a single MPDU, and the second MPDU may be an aggregated-MPDU (A-MPDU).

A last MPDU among the plurality of first MPDUs may include a normal ACK request (NAR).

The last MPDU may not be transmitted in a last TDD slot of the first transmission TDD slot.

The first reception TDD slot may be allocated after the first transmission TDD slot, and the second reception TDD slot may be allocated after the second transmission TDD slot.

The first transmission TDD slot may be allocated before the second transmission TDD slot.

The SP may include a first TDD interval and a second TDD interval, the first transmission TDD slot and the first reception TDD slot may be included in the first TDD interval, and the second transmission TDD slot and the second reception TDD slot may be included in the second TDD interval.

According to an embodiment proposed in the present specification, it is possible to efficiently operate a process of transmitting and receiving an ACK frame in a TDD SP in an 11ay system.

BRIEF DESCRIPTION OF THE DRAWINGS

FIG. 9 is a diagram showing a PPDU structure that can be applied to the present specification.

DESCRIPTION OF EXEMPLARY EMBODIMENTS

Hereinafter, the preferred embodiment of the present specification will be described in detail with reference to the appended drawings. The detailed description that will hereinafter be disclosed along with the appended drawings will only be provided to describe an exemplary embodiment of the present specification. And, therefore, it should be understood that the exemplary embodiment presented herein will not represent the only embodiment for carrying out the present specification.

The following detailed description includes specific details for providing a full understanding of the present specification. However, it will be apparent to anyone skilled in the art that the present specification can be carried out without referring to the above-mentioned specific details. In some cases, in order to avoid any ambiguity in the concept of the present specification, the disclosed structure and device may be omitted, or the disclosed structure and device may be illustrated as a block diagram based on their core functions.

Although diverse mobile communication systems applying the present specification may exist, a wireless LAN (WLAN) system will hereinafter be described in detail as an example of such mobile communication system.

1. Wireless LAN (WLAN) System 1-1. General Wireless LAN (WLAN) System

Figure 1:
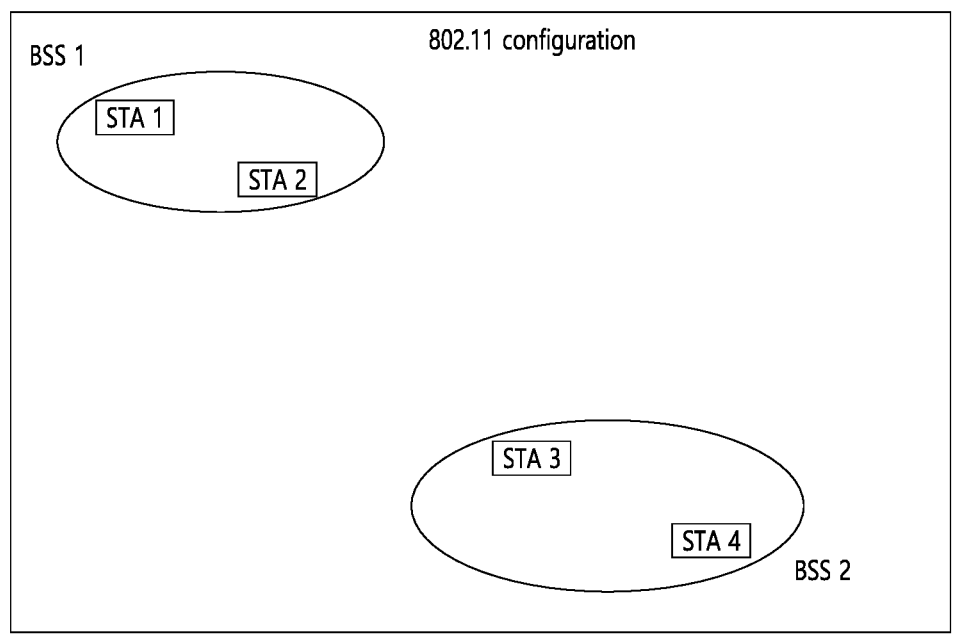
FIG. 1 is a diagram showing an exemplary configuration of a wireless LAN (WLAN) system.

FIG. 1 is a diagram showing an exemplary configuration of a wireless LAN (WLAN) system.

As shown in FIG. 1, a wireless LAN (WLAN) includes one or more Basic Service Set (BSS). A BSS is a set (or group) of stations (STAs) that successfully achieve synchronization so as to communication with one another.

As a logical entity including a Medium Access Control (MAC) and a Physical Layer interface for a wireless medium, an STA includes an access point (AP) and a non-AP Station. Among the STAs, a portable device (or terminal) that is operated by a user corresponds to a non-AP Station. And, therefore, when an entity is simply mentioned to as an STA, the STA may also refer to a non-AP Station. Herein, the non-AP Station may also be referred to as other terms, such as a terminal, a wireless transmit/receive unit (WTRU), a user equipment (UE), a mobile station (MS), a mobile terminal, a mobile subscriber unit, and so on.

Additionally, the AP is an entity providing its associated station (STA) with an access to a distribution system (DS) through a wireless medium. Herein, the AP may also be referred to as a centralized controller, a base station (B), a Node-B, a base transceiver system (BTS), a personal basic service set central point/access point (PCP/AP), a site controller, and so on.

A BSS may be categorized as an infrastructure BSS and an independent BSS (IBSS).

The BSS shown in FIG. 1 corresponds to an IBSS. The IBSS refers to a BSS that does not include an AP. And, since the BSS does not include an AP, access to the DS is not authorized (or approved), and, therefore, the IBSS functions as a self-contained network.

Figure 2:
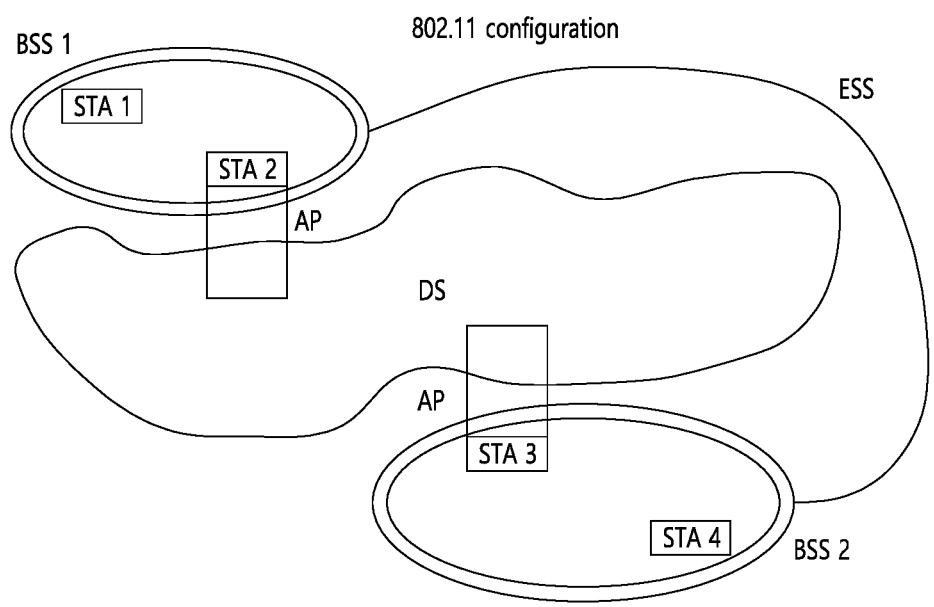
FIG. 2 is a diagram showing another exemplary configuration of a wireless LAN (WLAN) system.

FIG. 2 is a diagram showing another exemplary configuration of a wireless LAN (WLAN) system.

The BSS shown in FIG. 2 corresponds to an infrastructure BSS. The infrastructure BSS includes one or more STAs and APs. As a rule, although the communication between non-AP STAs is established by passing through the AP, in case a direct link is configured between the non-AP STAs, direct communication may also be established between the non-AP STAs.

As shown in FIG. 2, a plurality of infrastructure BSSs may be interconnected to one another through the DS. The plurality of BSSs being interconnected to one another through the DS is collectively referred to as an extended service set (ESS). The STAs being included in the ESS may perform communication between one another, and, a non-AP STA may shift (or relocate) from one BSS to another BSS within the same ESS while performing uninterrupted communication.

As a mechanism that connects the plurality of APs, the DS is not necessarily required to correspond to a network. As long as the DS is capable of providing a predetermined distribution service, there is no limitation in the structure or configuration of the DS. For example, the DS may correspond to a wireless network, such as a mesh network, or the DS may correspond to a physical structure (or entity) that connects the APs to one another.

Hereinafter, a channel bonding method that is performed in a wireless LAN system will hereinafter be described in detail based on the description presented above.

1-2. Channel Bonding in a Wireless LAN (WLAN) System

Figure 3:
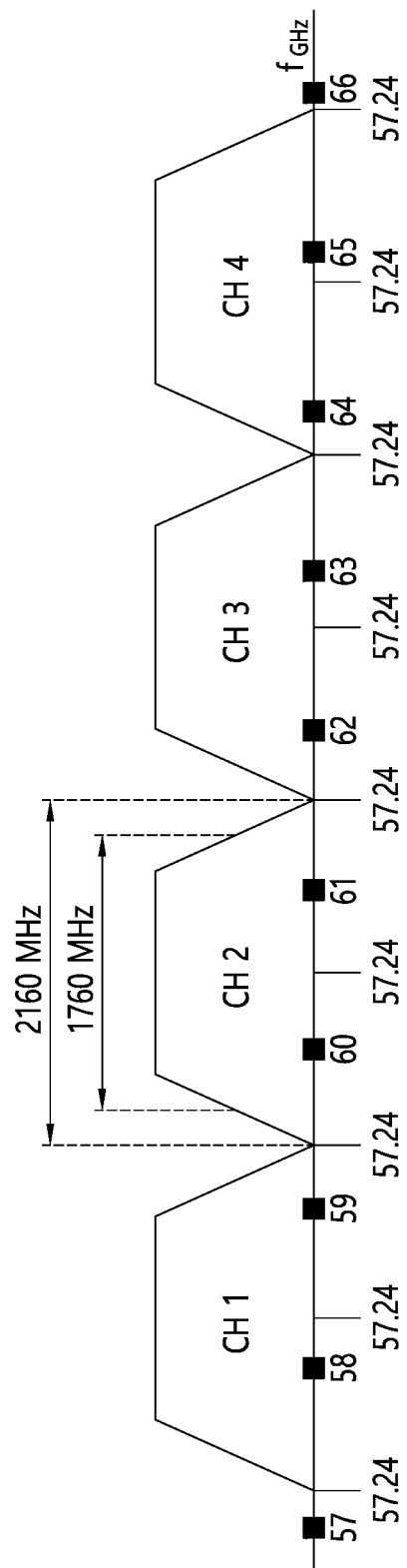
FIG. 3 is a diagram describing a channel in a 60 GHz band for describing a channel bonding operation according to an exemplary embodiment of the present specification.

FIG. 3 is a diagram describing a channel in a 60 GHz band for describing a channel bonding operation according to an exemplary embodiment of the present specification.

As shown in FIG. 3, 4 channels may be configured in a 60 GHz band, and a general channel bandwidth may be equal to 2.16 GHz. An ISM band (57 GHz~66 GHz), which is available for usage in 60 GHz, may be differently regulated in accordance with the circumstances (or situations) of each country. Generally, among the channels shown in FIG. 3, since Channel 2 is available for usage is all regions, Channel 2 may be used as a default channel. Channel 2 and Channel 3 may be used is most regions excluding Australia. And, accordingly, Channel 2 and Channel 3 may be used for channel bonding. However, it shall be understood that diverse channels may be used for channel bonding. And, therefore, the present specification will not be limited to only one or more specific channels.

Figure 4:
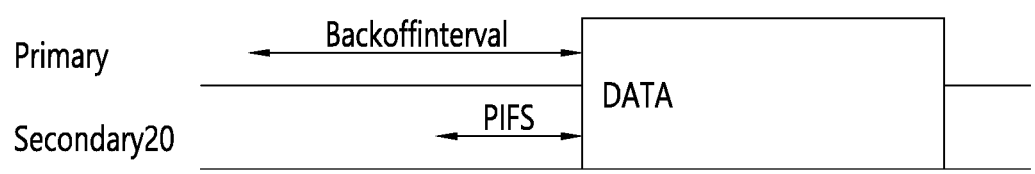
FIG. 4 is a diagram describing a basic method for performing channel bonding in a wireless LAN (WLAN) system.

FIG. 4 is a diagram describing a basic method for performing channel bonding in a wireless LAN (WLAN) system.

The example shown in FIG. 4 corresponds to an example of combining two 20 MHz channels and operating (or using) the combined channels for 40 MHz channel bonding in an IEEE 802.11n system. In case of an IEEE 802.11ac system, 40/80/160 MHz channel bonding may be performed.

The two exemplary channels of FIG. 4 include a primary channel and a secondary channel, and the STA may examine the channel status of the primary channel, among the two channels, by using a CSMA/CA method. If the primary channel is idle during a constant backoff interval, and, at a time point where the backoff count is equal to 0, if the secondary channel is idle during a predetermined period of time (e.g., PIFS), the STA may transmit data by combining the primary channel and the secondary channel.

However, in case of performing contention-based channel bonding, as shown in FIG. 4, as described above, since channel bonding can be performed only in a restricted case where the secondary channel maintains the idle state during a predetermined period of time at a time point where the backoff count for the primary channel is expired, the usage of channel bonding is very restricted (or limited). And, therefore, there lies a difficulty in that measures cannot be flexibly taken in accordance with the circumstances (or situation) of the medium.

Accordingly, in an aspect of the present specification, a solution (or method) for performing scheduling-based access by having the AP transmit scheduling information to the STAs is proposed. Meanwhile, in another aspect of the present specification, a solution (or method) for performing contention-based channel access based on the above-described scheduling or independently from the above-described scheduling is proposed. Furthermore, in yet another aspect of the present specification, a method for performing communication through a spatial sharing technique based on beamforming is proposed.

1-3. Beacon Interval Configuration

Figure 5:
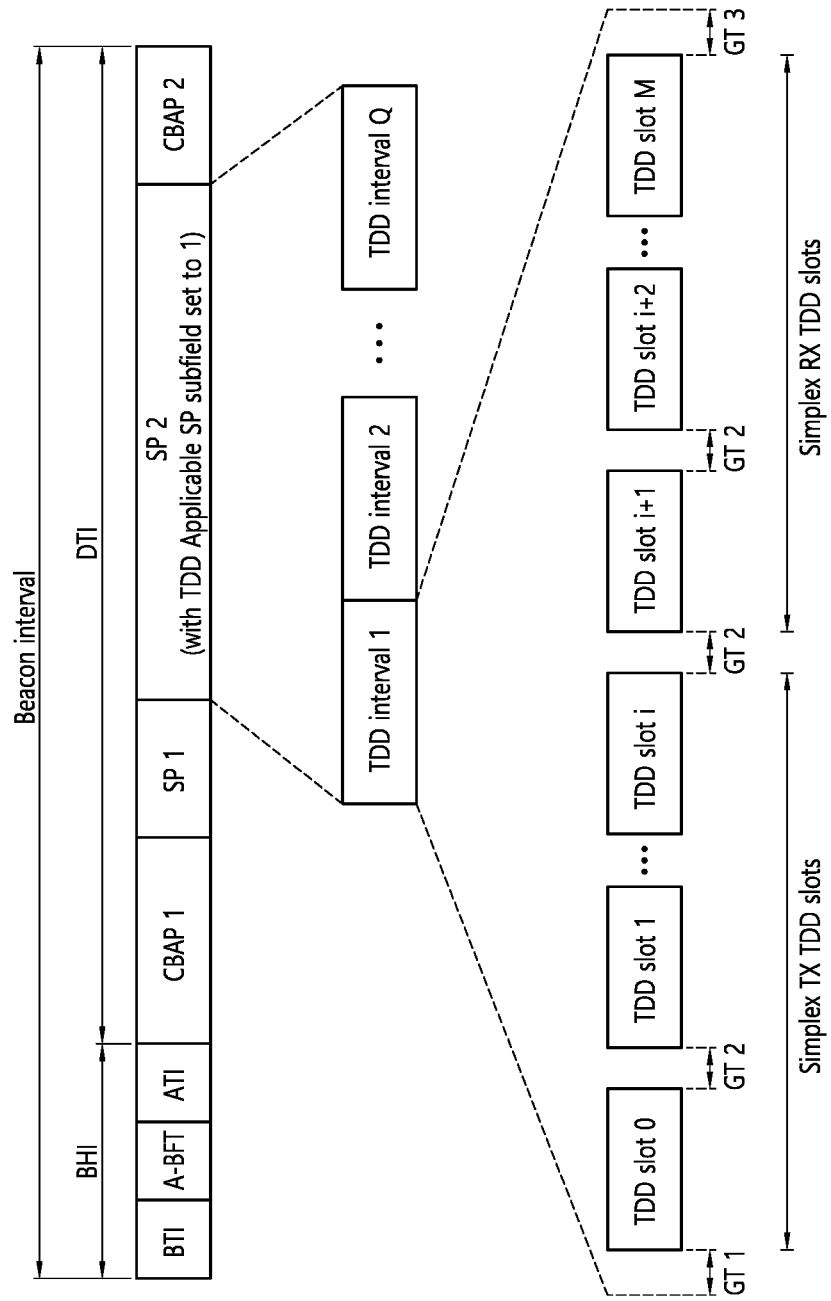
FIG. 5 is a diagram describing a configuration of a beacon interval.

FIG. 5 is a diagram describing a configuration of a beacon interval.

In an 11ad-based DMG BSS system, the time of medium may be divided into beacon intervals. A lower level period within the beacon interval may be referred to as an access period. Each of the different access periods within one beacon interval may have a different access rule. Such information on the access period may be transmitted by an AP or personal basic service set control point (PCP) to a non-AP STA or non-PCP.

As shown in the example of FIG. 5, one beacon interval may include one Beacon Header Interval (BHI) and one Data Transfer Interval (DTI). As shown in FIG. 4, the BHI may include a Beacon Transmission Interval (BTI), an Association Beamforming Training (A-BFT), and an Announcement Transmission Interval (ATI).

The BTI refers to a period (or section or duration) during which one more DMG beacon frames may be transmitted. The A-BFT refers to a period during which beamforming training is performed by an STA, which has transmitted a DMG beacon frame during a preceding BTI. The ATI refers to a request-response based management access period between PCP/AP and non-PCP/non-AP STA.

Meanwhile, the Data Transfer Interval (DTI) refers to a period during which a frame exchange is performed between the STAs. And, as shown FIG. 5, one or more Contention Based Access Periods (CBAPs) and one or more Service Periods (SPs) may be allocated (or assigned) to the DTI. Although FIG. 5 shows an example where 2 CBAPs and 2 SPs are allocated to the DCI, this is merely exemplary. And, therefore, the present specification is not necessarily required to be limited only to this.

FIG. 5 shows a structure of a TDD service period (SP). The TDD SP consists of one or more consecutive and adjacent TDD intervals (TDD interval 1, TDD interval 2, ..., TDD interval Q) actualized by a TDD slot structure element. The TDD interval includes one or more TDD slots. Adjacent TDD slots shown in FIG. 5 shall be separated temporally by a guard time (GT) defined by the TDD slot structure element (according to FIG. 5, the slots are separated temporally by GT1, GT2, GT3). If all STA operations are identical, transmission and reception of the adjacent TDD slots allocated to the same STA pair may be continued between the adjacent TDD slots.

An STA which intends to transmit data through a beamforming operation is referred to as an initiator, and an STA which receives data transmitted from the initiator is referred to as a responder. According to FIG. 5, the initiator may transmit data (or a frame) to the responder in a TX TDD slot (TDD slot 0, TDD slot 1, ..., TDD slot i), and the responder may receive data (or a frame) from the initiator in an RX TDD slot (TDD slot i+1, TDD slot i+2, ..., TDD slot M).

Hereinafter, a physical layer configuration in a wireless LAN (WLAN) system, in which the present specification is to be applied, will be described in detail.

1-4. Physical Layer Configuration

It will be assumed that the wireless LAN (WLAN) system according to an exemplary embodiment of the present specification may provide 3 different modulations mode as shown below.

TABLE 1

| PHY | MCS | Note |
|---|---|---|
| Control PHY | 0 | |
| Single carrier PHY (SC PHY) | 1 ... 12 | (low power SC PHY) |
| | 25 ... 31 | |
| OFDM PHY | 13 ... 24 | |

Figure 6:
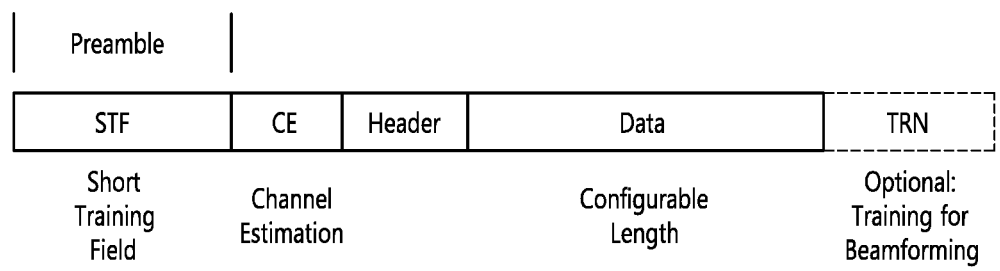
FIG. 6 is a diagram describing a physical configuration of a legacy radio frame.

Such modulation modes may be used for satisfying different requirements (e.g., high throughput or stability). Depending upon the system, among the modulation modes presented above, only some of the modulation modes may be supported. FIG. 6 is a diagram describing a physical configuration of a legacy radio frame.

It will be assumed that all Directional Multi-Gigabit (DMG) physical layers commonly include the fields that are shown below in FIG. 6. However, a regulation method of each individual field and a modulation/coding scheme used in each field may vary depending upon each mode.

As shown in FIG. 6, a preamble of a radio frame may include a Short Training Field (STF) and a Channel Estimation (CE). Additionally, the radio frame may also include a header and a data field as a payload of the radio frame and may optionally include a training (TRN) field for beamforming.

Figure 7:
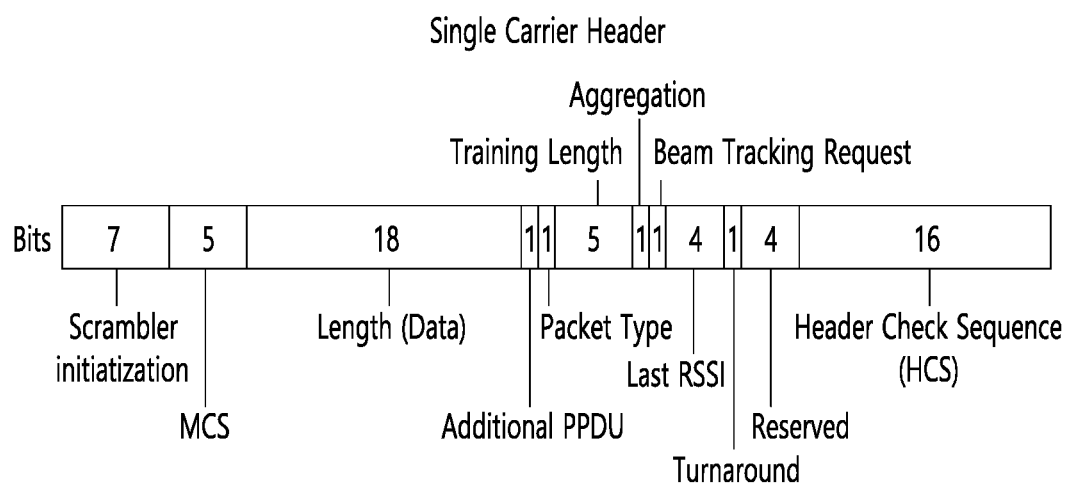
FIG. 7 and FIG. 8 are diagrams describing a configuration of a header field of the radio frame shown in FIG. 6.
Figure 8:
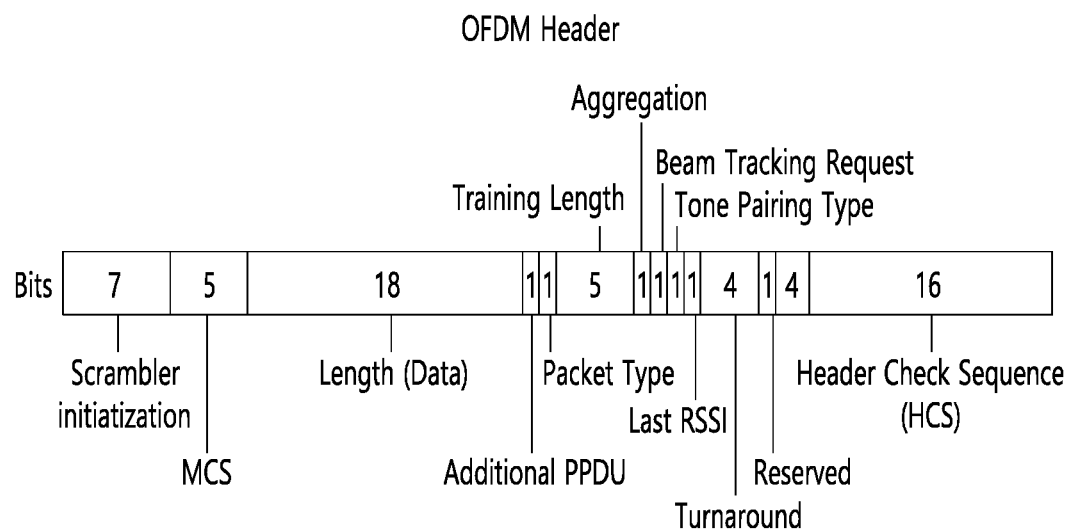

FIG. 7 and FIG. 8 are diagrams describing a configuration of a header field of the radio frame shown in FIG. 6.

More specifically, FIG. 7 illustrates a case where a Single Carrier (SC) mode is used. In the SC mode, the header may include information indicating an initial value of scrambling, information indicating a Modulation and Coding Scheme (MCS) and a data length, information indicating the presence or absence of an additional Physical Protocol Data Unit (PPDU), and information on a packet type, a training length, aggregation or non-aggregation, a presence or absence of a beam training request, a last Received Signal Strength Indicator (RSSI), truncation or non-truncation, a Header Check Sequence (HCS), and so on. Additionally, as shown in FIG. 7, the header has 4 bits of reserved bits, and, in the description presented below, such reserved bits may also be used.

Additionally, FIG. 8 illustrates a detailed configuration of a header corresponding to a case where the OFDM mode is applied. the header may include information indicating an initial value of scrambling, information indicating a MCS and a data length, information indicating the presence or absence of an additional PPDU, and information on a packet type, a training length, aggregation or non-aggregation, a presence or absence of a beam training request, a last RSSI, truncation or non-truncation, a Header Check Sequence (HCS), and so on. Additionally, as shown in FIG. 8, the header has 2 bits of reserved bits, and, just as in the case of FIG. 7, in the description presented below, such reserved bits may also be used.

As described above, the IEEE 802.11ay system considers for the first time the adoption of channel bonding the MIMO technique to the legacy 11ad system. In order to implement channel boning and MIMO, the 11ay system requires a new PPDU structure. In other words, when using the legacy 11ad PPDU structure, there are limitations in supporting the legacy user equipment (UE) and implementing channel bonding and MIMO at the same time.

For this, a new field for the 11ay UE may be defined after the legacy preamble and legacy header field for supporting the legacy UE. And, herein, channel bonding and MIMO may be supported by using the newly defined field.

FIG. 9 is a diagram showing a PPDU structure according to a preferred embodiment of the present specification. In FIG. 9, a horizontal axis may correspond to a time domain, and a vertical axis may correspond to a frequency domain.

When two or more channels are bonded, a frequency band having a predetermined size (e.g., a 400 MHz band) may exist between a frequency band (e.g., 1.83 GHz) that is used between each channel. In case of a Mixed mode, a legacy preamble (legacy STF, legacy CE) is duplicated through each channel. And, according to the exemplary embodiment of the present specification, it may be considered to perform the transmission (gap filling) of a new STF and CE field along with the legacy preamble at the same time through the 400 MHz band between each channel.

In this case, as shown in FIG. 9, the PPDU structure according to the present specification has a structure of transmitting ay STF, ay CE, ay Header B, and ay payload after legacy preamble, legacy header, and ay Header A via wideband. Therefore, the ay Header and ay Payload fields, which are transmitted after the Header field, may be transmitted through the channels that are used for the channel bonding. Hereinafter, in order to differentiate the ay Header from the legacy Header, the ay Header may be referred to as an enhanced directional multi-gigabit (EDMG) Header, and the corresponding terms may be used interchangeably.

For example, a total of 6 channels or 8 channels (each corresponding to 2.16 GHz) may exist in the 11ay system, and a maximum of 4 channels may be bonded and transmitted to a single STA. Accordingly, the ay header and the ay Payload may be transmitted through bandwidths of 2.16 GHz, 4.32 GHz, 6.48 GHz, and 8.64 GHz.

Alternatively, a PPDU format of a case where the legacy preamble is repeatedly transmitted without performing the above-described gap-filling may also be considered.

In this case, since the Gap-Filling is not performed, the PPDU has a format of transmitting the ay STF, ay CE, and ay Header B after the legacy preamble, legacy header, and ay Header A without the GF-STF and GF-CE fields, which are illustrated in dotted lines in FIG. 8.

Figure 10:
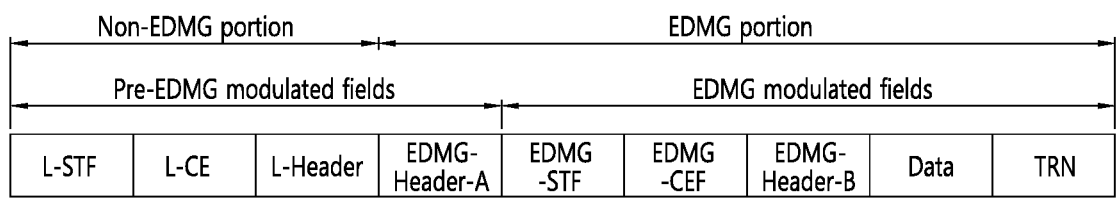
FIG. 10 is a diagram showing a simple PPDU structure that can be applied to the present specification.

FIG. 10 is a diagram showing a simple PPDU structure that can be applied to the present specification. When briefly summarizing the above-described PPDU format, the PPDU format may be illustrated as shown in FIG. 10.

As shown in FIG. 10, the PPDU format that is applicable to the 11ay system may include L-STF, L-CEF, L-Header, EDMG-Header-A, EDMG-STF, EDMG-CEF, EDMG-Header-B, Data, and TRN fields, and the above-mentioned fields may be selectively included in accordance with the format of the PPDU (e.g., SU PPDU, MU PPDU, and so on).

Herein, the part (or portion) including the L-STF, L-CEF, and L-header fields may be referred to as a Non-EDMG portion, and the remaining part (or portion) may be referred to as an EDMG portion (or region). Additionally, the L-STF, L-CEF, L-Header, and EDMG-Header-A fields may be referred to as pre-EDMG modulated fields, and the remaining fields may be referred to as EDMG modulated fields.

The (legacy) preamble may be the part of the PPDU that is used for packet detection, automatic gain control (AGC), frequency offset estimation, synchronization, indication of modulation (SC or OFDM) and channel estimation. The format of the preamble may be common to both OFDM packets and SC packets. In this case, the preamble may be composed of a short training field (STF) and a channel estimation (CE) located after the STF.

2. Beamforming Procedure that is Applicable to the Present Specification

As described above, methods such as channel bonding, channel aggregation, FDMA, and so on, which transmit data by using multiple channels at the same time may be applied in the 11ay system that can apply the present specification. Most particularly, since the 11ay system that can apply the present specification uses signals of a high frequency band, beamforming operation may be applied in order to transmit and/or receive signals at a high reliability level.

However, in the related art 11ad system, a beamforming method for one channel is only disclosed, and there is no implication on any beamforming method that can be applied for multiple channels. Accordingly, the present specification proposes a beamforming procedure that is applicable to a data transmission method being performing through multiple channels (e.g., channel bonding, channel aggregation, FDMA, and so on) according to the 11ay system.

More specifically, hereinafter a method of performing beamforming for only one channel (Section 3.1.) and a method of performing beamforming for multiple continuous or non-continuous channels (Section 3.2.), which are performed by the STA before the data transmission process in order to perform the data transmission through beamforming, will each be described in detail.

2.1. Performing Beamforming for Only One Channel

Figure 11:
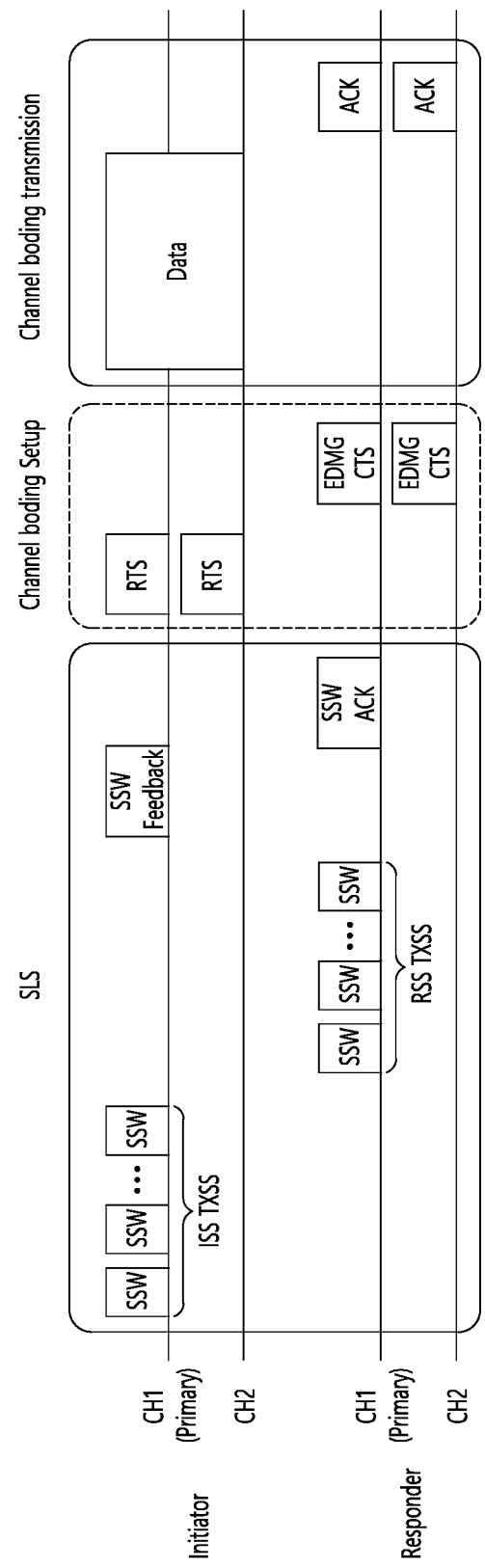
FIG. 11 is a diagram showing an operation for performing beamforming on one channel according to an exemplary embodiment of the present specification.

FIG. 11 is a diagram showing an operation for performing beamforming on one channel according to an exemplary embodiment of the present specification. Referring to FIG. 11, an STA that intends to transmit data through the beamforming operation is referred to as an initiator, and an STA that receives the data from the initiator is referred to as a responder. Also, although only a total of 2 channels (e.g., CH1, CH2) are shown in FIG. 11, the configuration of the present specification may also be extendedly applied to channel bonding, channel aggregation, and so on, through 3 or more channels.

As shown in FIG. 11, the beamforming procedure according to an exemplary embodiment of the present specification may be configured of a sector level sweep (SLS) phase, a channel bonding setup phase, and a channel bonding transmission phase. Hereinafter, the characteristics of each phase will be described in detail.

2.1.1. SLS Phase

In a 60 GHz band supporting the 11ay system, which can apply the present specification, in order to deliver data, control information, and so on, at a high reliability level, a directional transmission method, and not an omni transmission method, may be applied.

As a process for performing such application, the STAs that intend to transmit and/or receive data may be capable of knowing a Tx or Rx best sector for the initiator and the responder through the SLS process.

For a more detailed description of the above, configurations that are applicable to the SLS phase will hereinafter be described in detail with reference to the accompanying drawing(s).

Figure 12:
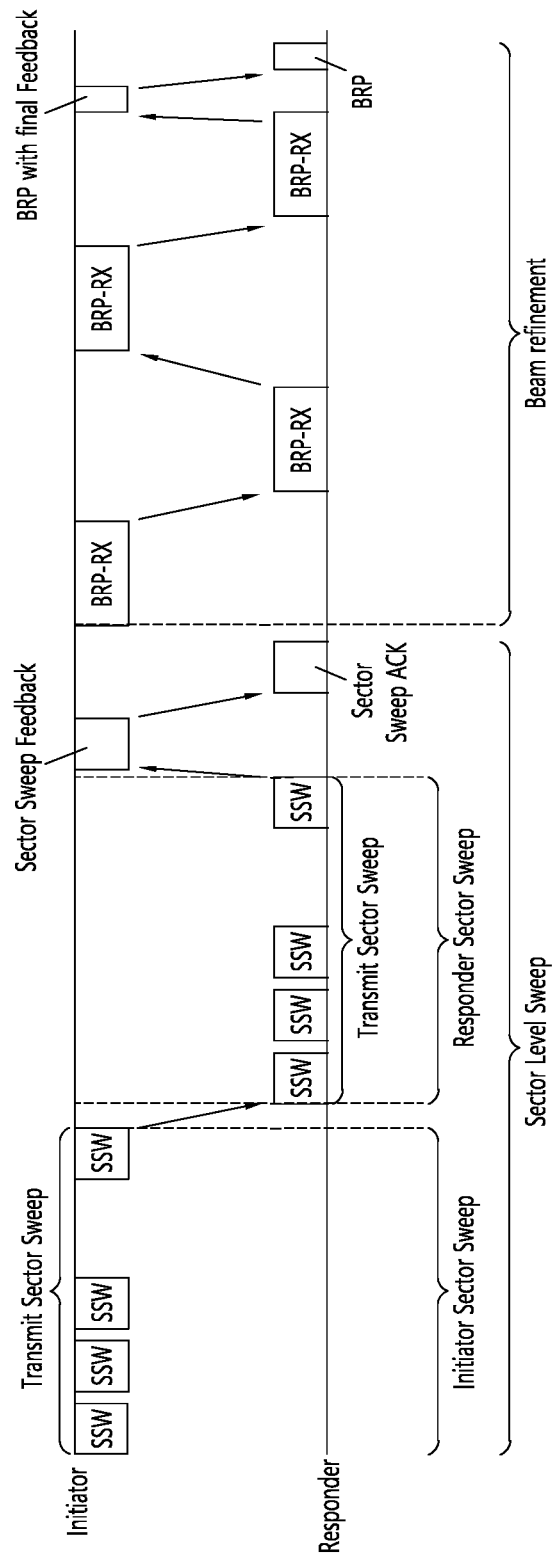
FIG. 12 shows an example of a beamforming training procedure that can be applied to the present specification.

FIG. 12 shows an example of a beamforming training procedure that can be applied to the present specification.

In a BF training that is generated during an Association BeamForming Training (A-BFT) allocation, the AP or PCP/AP becomes the initiator, and the non-AP and non-PCP/AP STA becomes the responder. In a BF training that is generated during an SP allocation, a source (EDMG) STA of the SP becomes the initiator, and a destination STA of the SP becomes the responder. In a BF training that is generated during a Transmission Opportunity (TXOP) allocation, a TXOP holder becomes the initiator, and a TXOP responder becomes the responder.

A link from the initiator to the responder is referred to as an initiator link, and a link from the responder to the initiator is referred to as a responder link.

The BF training is initiated along with the Sector Level Sweep (SLS) from the initiator. An object of the SLS phase is to allow communication to be established between two STAs in a control PHY layer or a higher MCS. Most particularly, the SLS phase provides only the transmission of the BF training.

Additionally, if a request is made by the initiator or the responder, a Beam Refinement Protocol or Beam Refinement Phase (BRP) may follow the SLS phase.

An object of the BRP phase is to enable iterative refinement of an Antenna Weight Vector (AWV) of all transmitter and receivers in all STAs. Among the STAs participating in the beam training, if one STA chooses to use only one transmission antenna pattern, reception training may be performed as part of the SLS phase.

As a more detailed description of the SLS phase, the SLS phase may include four elements listed below: an Initiator Sector Sweep (ISS) for training an initiator link, a Responder Sector Sweep (RSS) for training a responder link, a SSW feedback, and a SSW ACK.

The initiator initiates the SLS phase by transmitting the frame(s) of the ISS.

The responder does not initiate the transmission of the frame(s) of the RSS before the ISS is successfully completed. However, a case where the ISS is generated during the BTI may be an exemption.

The initiator does not initiate the SSW feedback before the RSS phase is successfully completed. However, a case where the RSS is generated within the A-BFT may be an exemption. The responder does not initiate the SSW ACK of the initiator during the A-BFT.

The responder initiates the SSW ACK of the initiator immediately after successfully completing the SSW feedback of the initiator.

During the SLS phase, the BF frame that is transmitted by the initiator may include a (EDMG) beacon frame, a SSW frame, and a SSW feedback frame. During the SLS phase, the BF frame that is transmitted by the responder may include a SSW frame and a SSW-ACK frame.

During the SLS, if each of the initiator and the responder executes the Transmit Sector Sweep (TXSS), at the end of the SLS phase, each of the initiator and the responder possesses its own transmit sector. If the ISS or RSS employs (or uses) a receive sector sweep, each of the responder or initiator possesses its own receive sector.

The STA does not change (or vary) the transmit power (or transport power) during the sector sweep.

Figure 13:
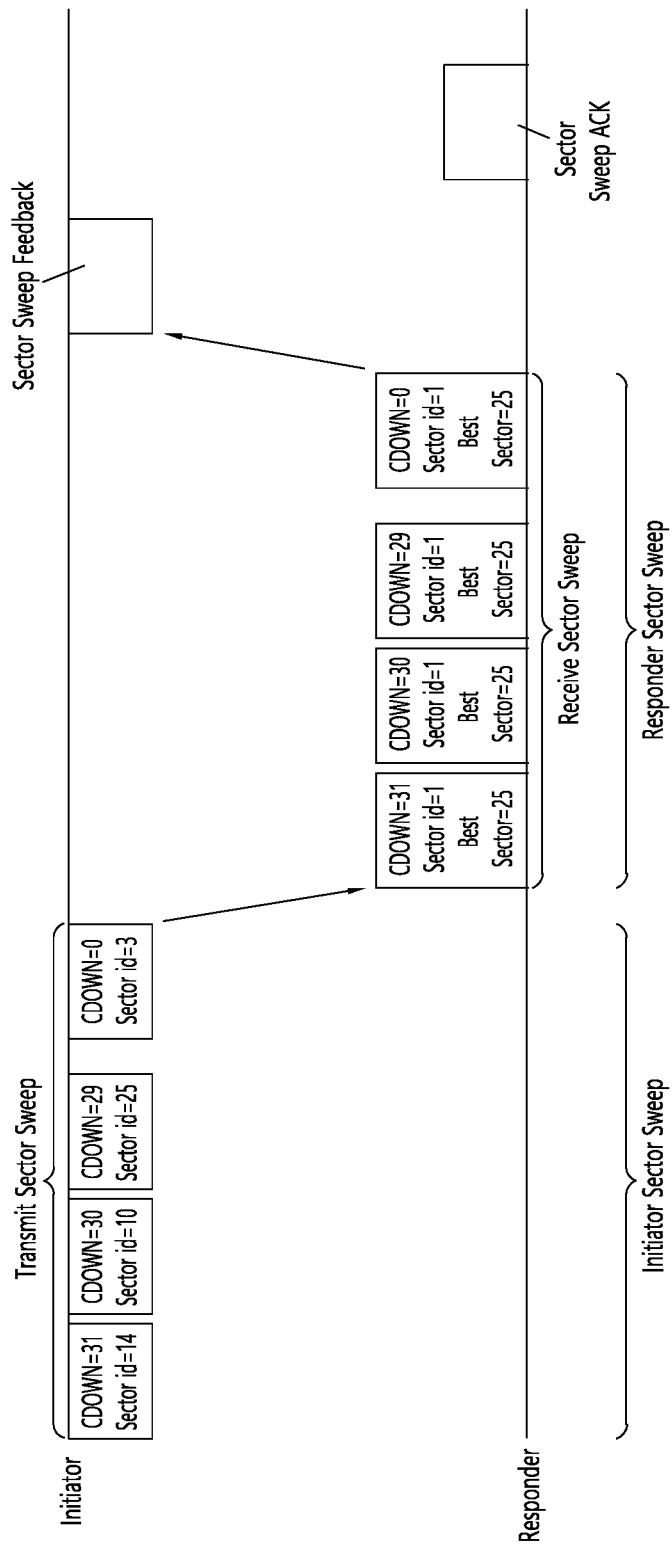
FIG. 13 and FIG. 14 is a diagram showing examples of a Sector Level Sweep (SLS) phase.
Figure 14:
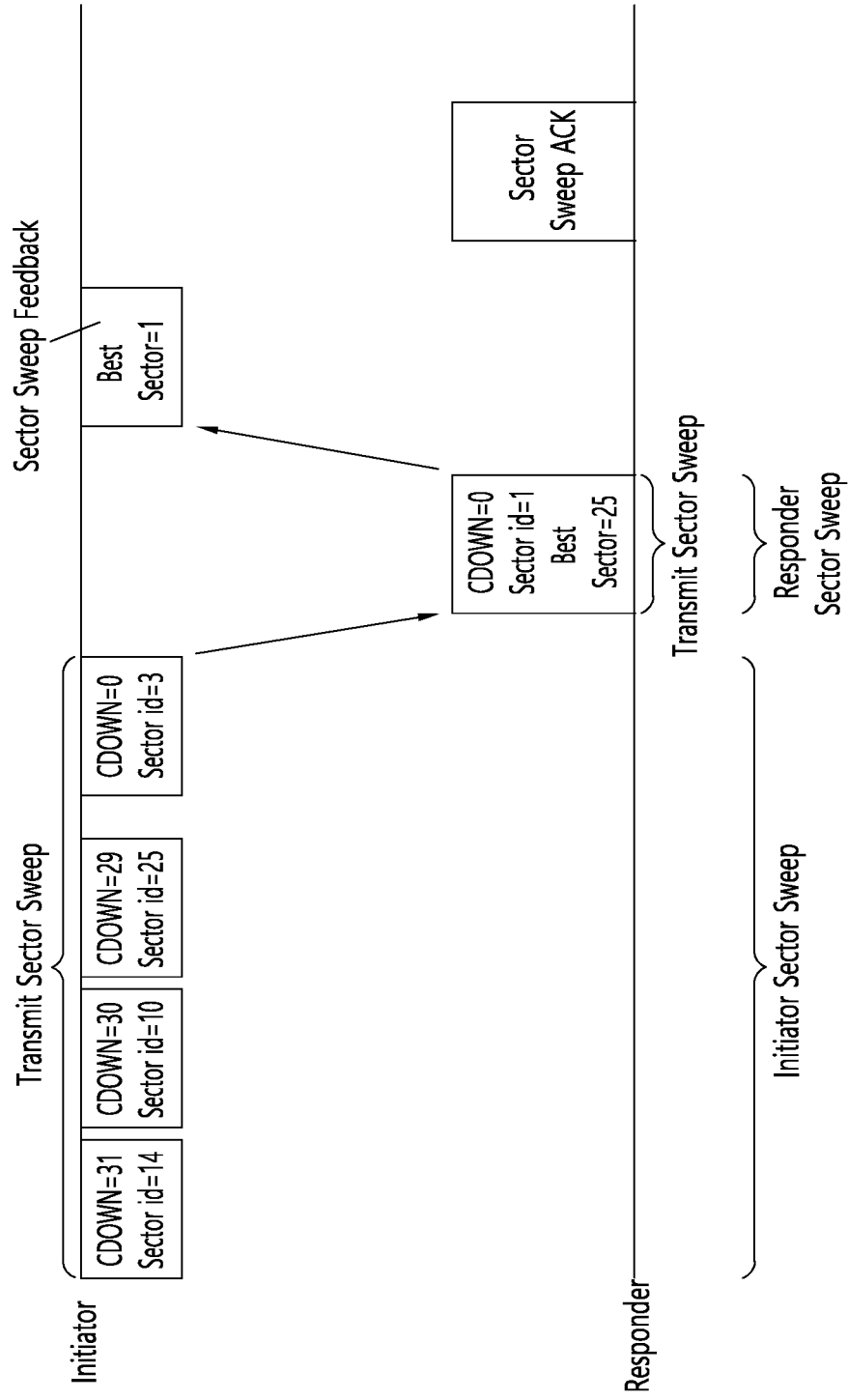

FIG. 13 and FIG. 14 is a diagram showing examples of a SLS phase.

In FIG. 13, the initiator has numerous sectors, and the responder has one transmit sector and one receive sector, which are used in the RSS. Accordingly, the responder transmits all of the responder SSW frames through the same transmit sector, and, at the same time, the initiator switches the receive antenna.

In FIG. 14, the initiator has numerous transmit sectors, and the responder has one transmit sector. In this case, the receive training for the initiator may be performed during the BRP phase.

Such SLS may be described as presented below.

As a protocol performing link detection in an 802.11ay system that can apply the present specification, the SLS corresponds to a beam training method, wherein network nodes consecutively transmits and/or receives frames including the same information by switching only the direction of the beam, and selecting, among the successfully received frames, a beam direction having the best index (e.g., Signal to Ratio (SNR), Received Signal Strength Indicator (RSSI), and so on) indicating the capability of the receive channel link.

Hereinafter, the BRP may be described as presented below.

As a protocol finely adjusting a beam direction that can maximize the data throughput from a beam direction, which is determined by the SLS or another means, the BRP may be performed when needed. Such BRP performs beam training by using a BRP frame, which is defined for the BRP protocol and which includes beam training information and information reporting the training results. For example, the BRP corresponds to a beam training method, wherein a BRP frame is transmitted and/or received by using a beam that is determined by a previous beam training, and wherein a beam training is actually performed by using a beam training sequence, which is included in an end part of the successfully transmitted and/or received BRP frame. The BRP is different from the SLS in that the SLS uses the frame itself for the beam training, whereas the BRP uses only a beam training sequence.

Such SLS phase may be performed during a Beacon Header Interval (BHI) and/or a Data Transfer Interval (DTI).

Firstly, the SLS phase being performed during the BHI may be the same as the SLS phase, which is defined in the 11ad system for its co-existence with the 11ad system.

Subsequently, the SLS phase, which is performed while the DTI is being performed, may be performed in case a beamforming training is not performed between the initiator and the responder, or in case a beamforming (BF) link is lost. At this point, if the initiator and the responder correspond to the 11ay STA, the initiator and the responder may transmit a short SSW frame instead of the SSW frame for the SLS phase.

Herein, the short SSW frame may be defined as a frame including a short SSW packet within a data field of a DMG control PHY or DMG control mode PPDU. At this point, a detailed format of the short SSW packet may be differently configured in accordance with the purpose (e.g., I-TXSS, R-TXSS, and so on) for which the short SSW packet is being transmitted.

The characteristics of the above-described SLS phase may also be applied to all of the SLS phases that will hereinafter be described.

2.1.2. Channel Bonding Setup Phase

Referring to FIG. 11, the STAs (e.g., initiator, responder, and so on) that intend to perform data communication in the above-described phase may transmit and/or receiving control information for channel bonding, channel aggregation, FDMA transmission, and so on, while sending and receiving an RTS (setup frame) and a DMG CTS (feedback frame) to and from one another. At this point, information for the transmission method using multiple channels, such as channel bonding, channel aggregation, FDMA transmission, and so on, wherein the information includes channel information, channel bandwidth, and so on, may be applied as the information being transmitted and received to and from one another.

In this exemplary embodiment, beamforming training for one channel (e.g., primary channel) has already been performed through the above-described SLS phase, and, accordingly, the initiator and the responder may assume that it is possible to equally apply the beamforming result (e.g., direction of the best sector) for the one channel to other channels as well. Accordingly, when the initiator and responder transmit the RTS and DMG CTS through multiple channels, the RTS and DMG CTS may be transmitted by applying the best sector direction, which is decided earlier through the SLS phase, as described above, to all of the channels.

2.1.3. Channel Bonding Transmission Phase

As shown in FIG. 11, after receiving the DMG CTS, which corresponds to the response to the transmitted RTS, the initiator may transmit actual data through multiple idle channels by using information formation on the channel that is negotiated with the responder, and other information, such as channel bandwidth, and so on.

More specifically, the initiator may transmit and/or receive the RTS and DMG CTS through the above-described channel bonding setup phase and may transmit and/or receive information on the actual channel to which the channel bonding (or channel aggregation) method is to be applied.

For example, although it is not shown in FIG. 11, even though the initiator has transmitted the RTS through a total of 4 channels, the initiator may receive DMG CTS for only 2 channels from the responder. This is because the responder has determined that the remaining 2 channels are currently in a busy state or in a state of being not available for usage.

By using the above-described method, the initiator and the responder may acquire information on the channel that can actually be used for the data transmitted, and the initiator may transmit data through channels that can actually be used.

At this point, since the initiator and the responder have already performed the beamforming training for only one channel (e.g., primary channel), the initiator and the responder may transmit and/or receive data signals by applying the beamforming training result (e.g., best sector direction), which was acquired from the one channel, to all channels.

Although FIG. 11 only shows the operation performed by the initiator for transmitting data by using channel bonding, the initiator may also transmit data by using the channel aggregation method.

In response to this, the responder may transmit an ACK frame through the same channel that was used by the initiator for transmitting the data. At this point, the ACK frame may be duplicated and transmitted through each channel, which was used for transmitting the data, or the ACK frame may be transmitted after performing channel bonding.

3. Acknowledgement Procedure

Hereinafter, an acknowledgement procedure proposed in 802.11ad will be described.

When receiving a frame that requires an acknowledgment, a non-AP and non-PCP STA operating in an SP having TDD channel access need to transmit an ACK or a block ACK at the beginning of a TDD slot that occurs first. In this case, as indicated by a TDD slot schedule element, the TDD slot that occurs first is allocated to the non-AP and non-PCP STA along with permission to access a TDD slot configured as a simplex RX TDD slot and the slot category of a TDD slot configured as a basic TDD slot.

When receiving a frame that requires an acknowledgment from the non-AP and non-PCP STA, a DMG AP or a DMG PCP operating in an SP having TDD channel access need to transmit an ACK or a block ACK at the beginning of a TDD slot that occurs first for the DMG AP having a To DS subfield of 1. In this case, as indicated by a TDD slot schedule element, the TDD slot that occurs first is allocated to the non-AP and non-PCP STA along with permission to access a TDD slot configured as a simplex RX TDD slot and the slot category of a TDD slot configured as a basic TDD slot.

A non-AP and non-PCP STA operating in an SP having TDD channel access has the same AckTimeout interval as an interval from a PHY_TXEND.confirm primitive of a current frame to the end of a TDD slot that occurs first. As indicated by a TDD slot schedule element, the TDD slot that occurs first is allocated to an addressed receiver of an MPDU along with permission to access a TDD slot configured as a simplex RX TDD slot and the slot category of a TDD slot configured as a basic TDD slot.

A DMG AP or a DMG PCP operating in an SP having TDD channel access has the same AckTimeout interval as an interval from a PHY_TXEND.confirm primitive of a current frame to the end of a TDD slot that occurs first. As indicated by a TDD slot schedule element, the TDD slot that occurs first is allocated to an addressed receiver of an MPDU along with permission to access a TDD slot configured as a simplex RX TDD slot and the slot category of a TDD slot configured as a basic TDD slot.

4. Embodiments Applicable to the Present Specification

In 11ay, it is possible to operate a TDD scheduling scheme in which downlink (DL)/uplink (UL) transmission is performed by temporally dividing an existing service period (SP). In an existing system, when data is received, an ACK frame is transmitted in response to the data. To actually operate the TDD scheduling scheme, it is necessary to transmit an ACK frame even in a TDD scheduling operation. This specification proposes a method for efficiently providing ACK information when operating a TDD scheme in 11ay.

This specification proposes an efficient ACK frame transmission method in a practical TDD scheduling scheme in 11ay. In a TDD SP, a TX/RX slot is allocated and scheduled according to a STA. Here, a process of exchanging ACK information in response to a received slot and data also needs to be operated. This specification proposes a method for efficiently operating a process of transmitting and receiving an ACK frame in a TDD SP.

An ACK of a TX TDD slot is transmitted in the earliest simplex RX TDD slot. However, in this case, an ACK or a block ACK may not be applied.

A plurality of single PPDUs is transmitted, and a plurality of management frames requiring an ACK is transmitted.

In this case, a block ACK cannot be transmitted, and an ACK of a plurality of TX TDD slots is also not defined. Accordingly, this specification proposes an efficient ACK procedure for TDD slot allocation.

In 11ay TDD channel access, it is defined to transmit an ACK frame in response to a previous TX TDD slot in an RX TDD slot. Here, to transmit the ACK frame in the RX TDD slot, it is necessary to define data transmission in the previous TX TDD slot and a process for the ACK frame in the RX TDD slot. A method for transmitting an ACK frame in response to data received in a TDD slot in 11ay may be one of the following.

Type of data that can be transmitted in TX TDD slot before RX TDD slot for transmitting ACK
Single MPDU
A-MPDU When a single MPDU or an A-MPDU is transmitted in a plurality of TX TDD slots before the RX TDD slot, a configuration according to an ACK policy may be established as follows.

It is not allowed to transmit the following data before the RX TDD slot for transmitting the ACK frame. It is not allowed to transmit two or more single MPDUs or A-MPDUs having an ACK policy of a normal ACK or implicit block ACK request. In this case, the unit is the number of TX TDD slots.

An A-MPDU may be transmitted in a plurality of TX TDD slots, in which case the A-MPDU is configured as an ACK or a block ACK.

The above details may be summarized and defined as follows.

A DMG AP or a DMG STA is not allowed to transmit one or more single MPDUs or A-MPDUs having an ACK policy of a normal ACK or implicit block ACK request to a receiver for one or more TDD slots allocated to the receiver before a TDD slot that occurs first. The addressed receiver of the MPDU is assigned to transmit an ACK or block ACK frame.

Possible embodiments according to the above details will be described.

Embodiment 1) When a plurality of A-MPDUs is Transmitted

Figure 15:
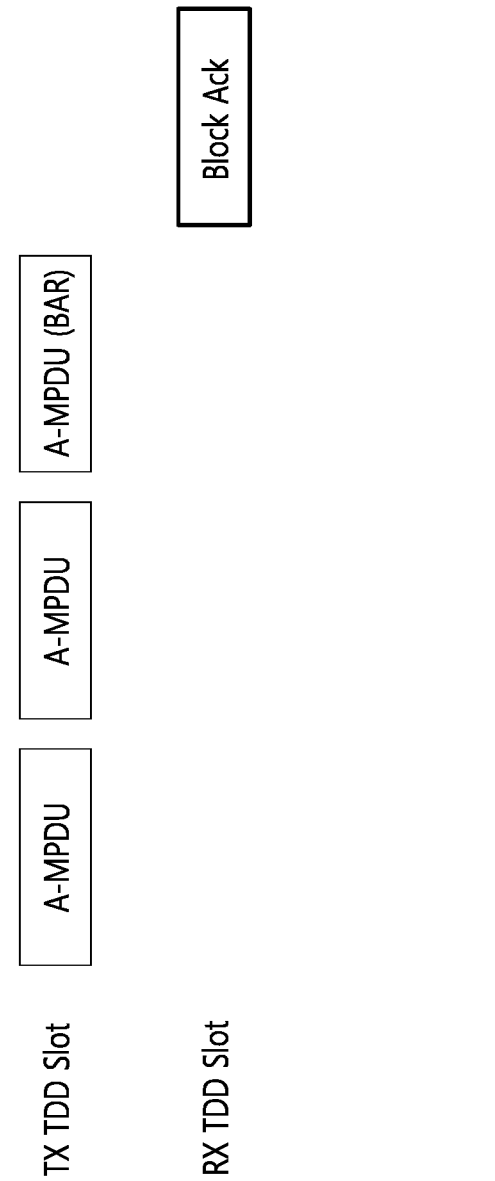
FIG. 15 shows an example of transmitting an ACK when a plurality of A-MPDUs is transmitted according to an exemplary embodiment.

FIG. 15 shows an example of transmitting an ACK when a plurality of A-MPDUs is transmitted according to an exemplary embodiment.

Among a plurality of A-MPDUs, an A-MPDU transmitted last before an RX TDD slot has an ACK policy of a block ACK request. The last transmitted A-MPDU may not correspond to the last TX TDD slot before the RX TDD slot.

Embodiment 2) When a single MPDU and a Plurality of A-MPDUs are Transmitted

Figure 16:
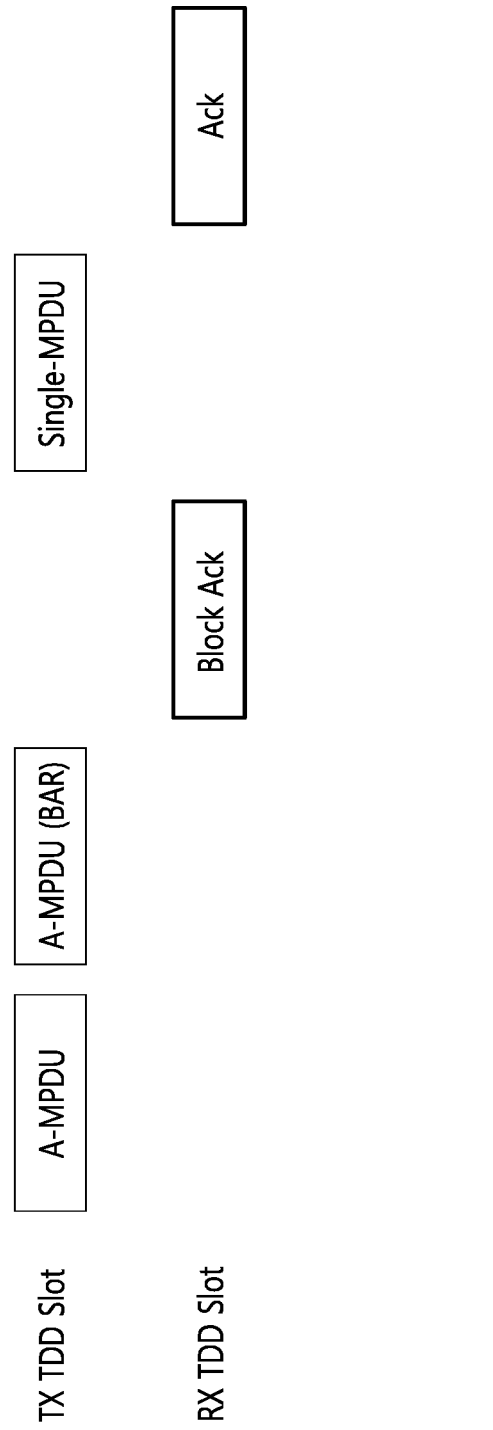
FIG. 16 shows an example of transmitting an ACK when a single MPDU and a plurality of A-MPDUs are transmitted according to an exemplary embodiment.

FIG. 16 shows an example of transmitting an ACK when a single MPDU and a plurality of A-MPDUs are transmitted according to an exemplary embodiment.

An A-MPDU/single MPDU having a normal ACK or implicit block ACK request cannot be allocated to two or more TX TDD slots before an ACK.

Figure 17:
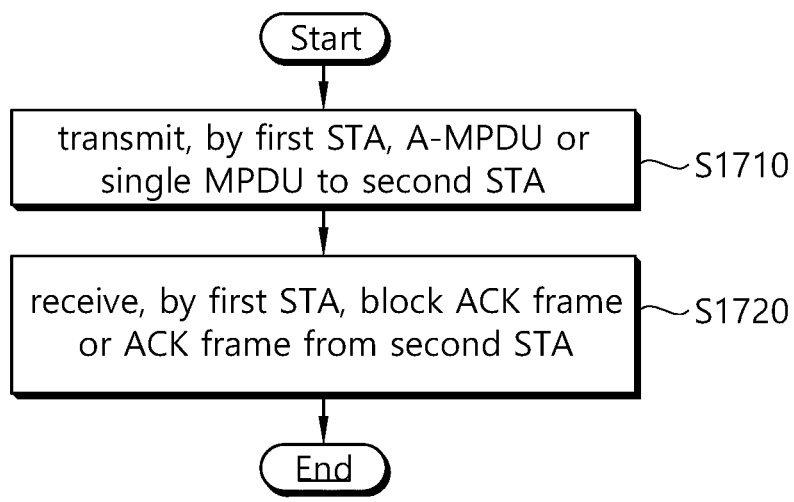
FIG. 17 is a flowchart illustrating a procedure for receiving an ACK frame in a TDD scheduling scheme according to an exemplary embodiment.

FIG. 17 is a flowchart illustrating a procedure for receiving an ACK frame in a TDD scheduling scheme according to an exemplary embodiment.

This embodiment proposes a method for efficiently providing ACK information in a TDD scheduling scheme in an 802.11ay system.

In operation S1710, a first station (STA) transmits an A-MPDU or a single MPDU to a second STA.

In operation S1720, the first STA receives a block ACK frame or an ACK frame from the second STA.

Specific operations of the first STA and the second STA will be described as follows.

The first STA transmits a plurality of first MAC protocol data units (MPDUs) to the second STA in a first transmission TDD slot.

The first STA receives a first ACK frame of the plurality of first MPDUs from the second STA in a first reception TDD slot.

The first STA transmits a second MPDU to the second STA in a second transmission TDD slot.

The first STA receives a second ACK frame of the second MPDU from the second STA in a second reception TDD slot.

The plurality of first MPDUs, the second MPDU, the first ACK frame, and the second ACK frame are transmitted and received in a service period based on time division duplex (TDD).

The SP includes the first and second transmission TDD slots and the first and second reception TDD slots.

The plurality of first MPDUs is consecutively transmitted in a plurality of TDD slots within the first transmission TDD slot.

Each of the plurality of first MPDUs may be an aggregated-MPDU (A-MPDU), and the second MPDU may be a single MPDU. The A-MPDU is an MPDU in which a plurality of MPDUs is aggregated, and the single MPDU is an MPDU in which only one MPDU is included.

The first ACK frame may be a block acknowledgement (BA) frame including information on whether each of the plurality of first MPDUs is successfully received, and the second ACK frame may be a normal ACK frame. The BA frame may be configured in a bitmap and may be indicate whether each of the plurality of first MPDUs is successfully received.

A last MPDU among the plurality of first MPDUs may include a block ACK request (BAR).

The last MPDU may not be transmitted in a last TDD slot of the first transmission TDD slot.

Each of the plurality of first MPDUs may be a single MPDU, and the second MPDU may be an aggregated-MPDU (A-MPDU).

A last MPDU among the plurality of first MPDUs may include a normal ACK request (NAR).

The last MPDU may not be transmitted in a last TDD slot of the first transmission TDD slot.

The first reception TDD slot may be allocated after the first transmission TDD slot, and the second reception TDD slot may be allocated after the second transmission TDD slot.

The first transmission TDD slot may be allocated before the second transmission TDD slot.

The SP may include a first TDD interval and a second TDD interval, the first transmission TDD slot and the first reception TDD slot may be included in the first TDD interval, and the second transmission TDD slot and the second reception TDD slot may be included in the second TDD interval.

Figure 18:
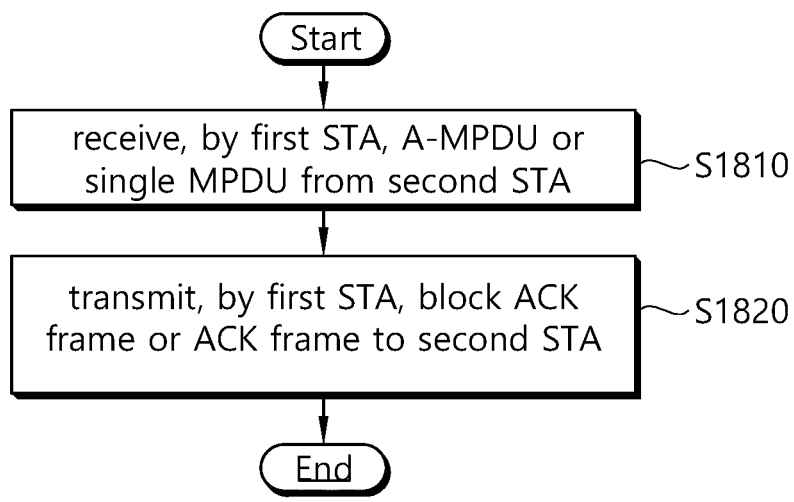
FIG. 18 is a flowchart illustrating a procedure for transmitting an ACK frame in a TDD scheduling scheme according to an exemplary embodiment.

FIG. 18 is a flowchart illustrating a procedure for transmitting an ACK frame in a TDD scheduling scheme according to an exemplary embodiment.

This embodiment proposes a method for efficiently providing ACK information in a TDD scheduling scheme in an 802.11ay system.

In operation S1810, a first station (STA) receives an A-MPDU or a single MPDU from a second STA.

In operation S1820, the first STA transmits a block ACK frame or an ACK frame to the second STA.

Specific operations of the first STA and the second STA will be described as follows.

The first STA receives a plurality of first MAC protocol data units (MPDUs) from the second STA in a first transmission TDD slot.

The first STA transmits a first ACK frame of the plurality of first MPDUs to the second STA in a first reception TDD slot.

The first STA receives a second MPDU from the second STA in a second transmission TDD slot.

The first STA transmits a second ACK frame of the second MPDU to the second STA in a second reception TDD slot.

The plurality of first MPDUs, the second MPDU, the first ACK frame, and the second ACK frame are transmitted and received in a service period based on time division duplex (TDD).

The SP includes the first and second transmission TDD slots and the first and second reception TDD slots.

The plurality of first MPDUs is consecutively transmitted in a plurality of TDD slots within the first transmission TDD slot.

Each of the plurality of first MPDUs may be an aggregated-MPDU (A-MPDU), and the second MPDU may be a single MPDU. The A-MPDU is an MPDU in which a plurality of MPDUs is aggregated, and the single MPDU is an MPDU in which only one MPDU is included.

The first ACK frame may be a block acknowledgement (BA) frame including information on whether each of the plurality of first MPDUs is successfully received, and the second ACK frame may be a normal ACK frame. The BA frame may be configured in a bitmap and may be indicate whether each of the plurality of first MPDUs is successfully received.

A last MPDU among the plurality of first MPDUs may include a block ACK request (BAR).

The last MPDU may not be transmitted in a last TDD slot of the first transmission TDD slot.

Each of the plurality of first MPDUs may be a single MPDU, and the second MPDU may be an aggregated-MPDU (A-MPDU).

A last MPDU among the plurality of first MPDUs may include a normal ACK request (NAR).

The last MPDU may not be transmitted in a last TDD slot of the first transmission TDD slot.

The first reception TDD slot may be allocated after the first transmission TDD slot, and the second reception TDD slot may be allocated after the second transmission TDD slot.

The first transmission TDD slot may be allocated before the second transmission TDD slot.

The SP may include a first TDD interval and a second TDD interval, the first transmission TDD slot and the first reception TDD slot may be included in the first TDD interval, and the second transmission TDD slot and the second reception TDD slot may be included in the second TDD interval.

Figure 19:
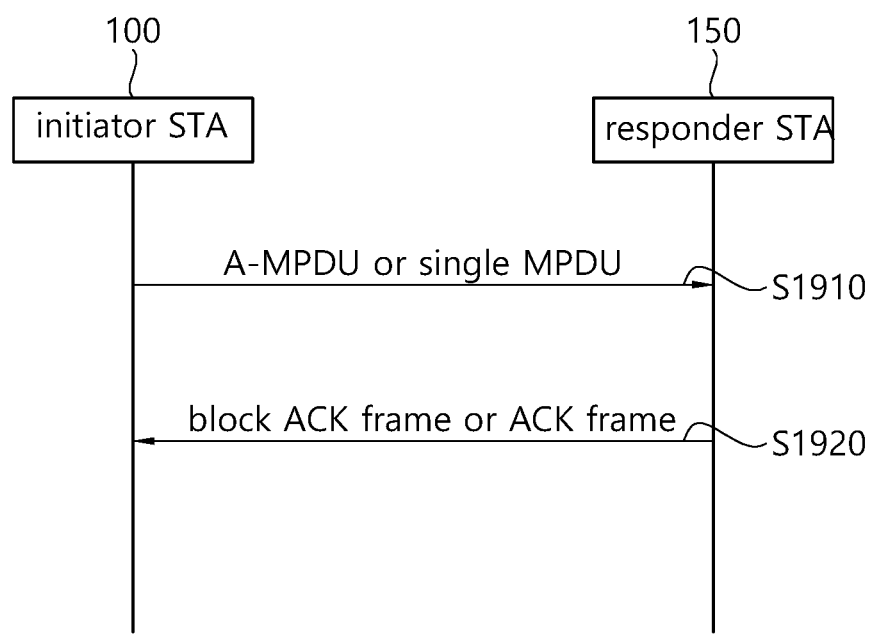
FIG. 19 illustrates a procedure of an ACK operation in a TDD scheduling scheme according to an exemplary embodiment.

FIG. 19 illustrates a procedure of an ACK operation in a TDD scheduling scheme according to an exemplary embodiment.

First, terms are defined. A first STA may correspond to an initiator 100 to transmit an MPDU, and a second STA may correspond to a responder 150 to transmit an ACK frame in response to the MPDU.

In operation S1910, the first STA transmits an A-MPDU or a single MPDU to a second STA.

In operation S1920, the first STA receives a block ACK frame or an ACK frame from the second STA.

Specific operations of the first STA and the second STA will be described as follows.

The first STA transmits a plurality of first MAC protocol data units (MPDUs) to the second STA in a first transmission TDD slot.

The first STA receives a first ACK frame of the plurality of first MPDUs from the second STA in a first reception TDD slot.

The first STA transmits a second MPDU to the second STA in a second transmission TDD slot.

The first STA receives a second ACK frame of the second MPDU from the second STA in a second reception TDD slot.

The plurality of first MPDUs, the second MPDU, the first ACK frame, and the second ACK frame are transmitted and received in a service period based on time division duplex (TDD).

The SP includes the first and second transmission TDD slots and the first and second reception TDD slots.

The plurality of first MPDUs is consecutively transmitted in a plurality of TDD slots within the first transmission TDD slot.

Each of the plurality of first MPDUs may be an aggregated-MPDU (A-MPDU), and the second MPDU may be a single MPDU. The A-MPDU is an MPDU in which a plurality of MPDUs is aggregated, and the single MPDU is an MPDU in which only one MPDU is included.

The first ACK frame may be a block acknowledgement (BA) frame including information on whether each of the plurality of first MPDUs is successfully received, and the second ACK frame may be a normal ACK frame. The BA frame may be configured in a bitmap and may be indicate whether each of the plurality of first MPDUs is successfully received.

A last MPDU among the plurality of first MPDUs may include a block ACK request (BAR).

The last MPDU may not be transmitted in a last TDD slot of the first transmission TDD slot.

Each of the plurality of first MPDUs may be a single MPDU, and the second MPDU may be an aggregated-MPDU (A-MPDU).

A last MPDU among the plurality of first MPDUs may include a normal ACK request (NAR).

The last MPDU may not be transmitted in a last TDD slot of the first transmission TDD slot.

The first reception TDD slot may be allocated after the first transmission TDD slot, and the second reception TDD slot may be allocated after the second transmission TDD slot.

The first transmission TDD slot may be allocated before the second transmission TDD slot.

The SP may include a first TDD interval and a second TDD interval, the first transmission TDD slot and the first reception TDD slot may be included in the first TDD interval, and the second transmission TDD slot and the second reception TDD slot may be included in the second TDD interval.

5. Device Configuration

Figure 20:
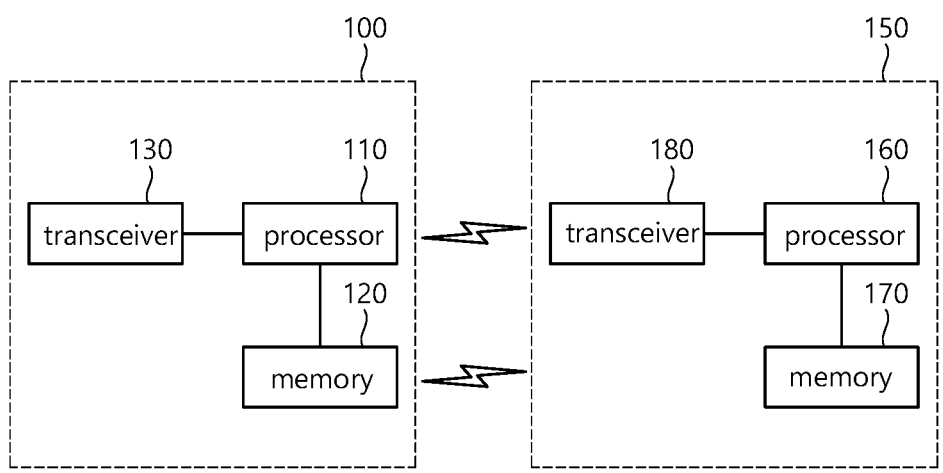
FIG. 20 is a diagram showing a device for implementing the above-described method.

FIG. 20 is a diagram describing a device for implementing the above-described method.

A wireless device (100) of FIG. 20 may correspond to an initiator STA, which transmits a signal that is described in the description presented above, and a wireless device (150) may correspond to a responder STA, which receives a signal that is described in the description presented above. At this point, each station may correspond to a 11ay device (or user equipment (UE)) or a PCP/AP. Hereinafter, for simplicity in the description of the present specification, the initiator STA transmits a signal is referred to as a transmitting device (100), and the responder STA receiving a signal is referred to as a receiving device (150).

The transmitting device (100) may include a processor (110), a memory (120), and a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art The processor (110, 160) may implement functions, processes, and/or methods proposed in the present specification. For example, the processor (110, 160) may perform the aforementioned operation according to the present embodiment.

A specific operation of the processor (110) of the transmitting device is as follows. The processor (110) of the transmitting device transmits an A-MPDU or a single MPDU, and receives a block ACK frame or an ACK frame transmitted in response to the A-MPDU or the single MPDU.

A specific operation of the processor (160) of the receiving device is as follows. The processor (160) of the receiving device receives an A-MPDU or a single MPDU, and transmits a block ACK frame or an ACK frame in response to the A-MPDU or the single MPDU.

Figure 21:
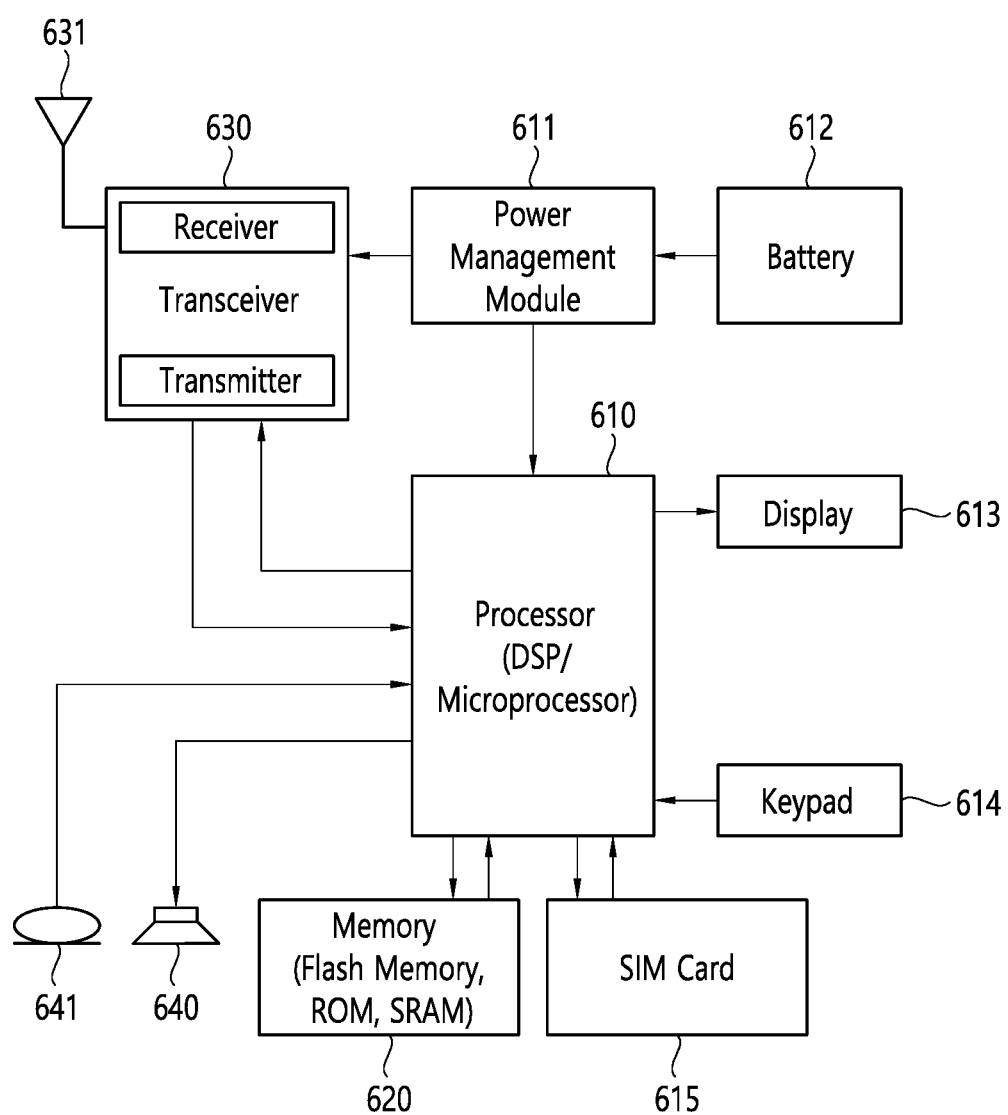
FIG. 21 shows a more detailed wireless device implementing an exemplary embodiment of the present specification.

FIG. 21 shows more detailed wireless device to implement an embodiment of the present specification. The present specification described above for the transmitting device or the receiving device may be applied to this embodiment.

A wireless device includes a processor (610), a power management module (611), a battery (612), a display (613), a keypad (614), a subscriber identification module (SIM) card (615), a memory (620), a transceiver (630), one or more antennas (631), a speaker (640), and a microphone (641).

The processor (610) may be configured to implement proposed functions, procedures and/or methods described in this description. Layers of the radio interface protocol may be implemented in the processor (610). The processor (610) may include ASIC, other chipset, logic circuit and/or data processing device. The processor (610) may be an application processor (AP). The processor (610) may include at least one of a digital signal processor (DSP), a central processing unit (CPU), a graphics processing unit (GPU), a modem (modulator and demodulator). An example of the processor (610) may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module (611) manages power for the processor (610) and/or the transceiver (630). The battery (612) supplies power to the power management module (611). The display (613) outputs results processed by the processor (610). The keypad (614) receives inputs to be used by the processor (610). The keypad (614) may be shown on the display (613). The SIM card (615) is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory (620) is operatively coupled with the processor (610) and stores a variety of information to operate the processor (610). The memory (620) may include ROM, RAM, flash memory, memory card, storage medium and/or other storage device. When the embodiments are implemented in software, the techniques described herein can be implemented with modules (e.g., procedures, functions, and so on) that perform the functions described herein. The modules can be stored in the memory (620) and executed by the processor (610). The memory (620) can be implemented within the processor (610) or external to the processor (610) in which case those can be communicatively coupled to the processor (610) via various means as is known in the art.

The transceiver (630) is operatively coupled with the processor (610), and transmits and/or receives a radio signal. The transceiver (630) includes a transmitter and a receiver. The transceiver (630) may include baseband circuitry to process radio frequency signals. The transceiver (630) controls the one or more antennas (631) to transmit and/or receive a radio signal.

The speaker (640) outputs sound-related results processed by the processor (610). The microphone (641) receives sound-related inputs to be used by the processor (610).

In a transmitting device, the processor (610) of the transmitting device transmits an A-MPDU or a single MPDU, and receives a block ACK frame or an ACK frame transmitted in response to the A-MPDU or the single MPDU.

In a receiving device, the processor (610) of the receiving device receives an A-MPDU or a single MPDU, and transmits a block ACK frame or an ACK frame in response to the A-MPDU or the single MPDU.

Specific operations of the first STA and the second STA will be described as follows.

The first STA transmits a plurality of first MAC protocol data units (MPDUs) to the second STA in a first transmission TDD slot.

The first STA receives a first ACK frame of the plurality of first MPDUs from the second STA in a first reception TDD slot.

The first STA transmits a second MPDU to the second STA in a second transmission TDD slot.

The first STA receives a second ACK frame of the second MPDU from the second STA in a second reception TDD slot.

The plurality of first MPDUs, the second MPDU, the first ACK frame, and the second ACK frame are transmitted and received in a service period based on time division duplex (TDD).

The SP includes the first and second transmission TDD slots and the first and second reception TDD slots.

The plurality of first MPDUs is consecutively transmitted in a plurality of TDD slots within the first transmission TDD slot.

Each of the plurality of first MPDUs may be an aggregated-MPDU (A-MPDU), and the second MPDU may be a single MPDU. The A-MPDU is an MPDU in which a plurality of MPDUs is aggregated, and the single MPDU is an MPDU in which only one MPDU is included.

The first ACK frame may be a block acknowledgement (BA) frame including information on whether each of the plurality of first MPDUs is successfully received, and the second ACK frame may be a normal ACK frame. The BA frame may be configured in a bitmap and may be indicate whether each of the plurality of first MPDUs is successfully received.

A last MPDU among the plurality of first MPDUs may include a block ACK request (BAR).

The last MPDU may not be transmitted in a last TDD slot of the first transmission TDD slot.

Each of the plurality of first MPDUs may be a single MPDU, and the second MPDU may be an aggregated-MPDU (A-MPDU).

A last MPDU among the plurality of first MPDUs may include a normal ACK request (NAR).

The last MPDU may not be transmitted in a last TDD slot of the first transmission TDD slot.

The first reception TDD slot may be allocated after the first transmission TDD slot, and the second reception TDD slot may be allocated after the second transmission TDD slot.

The first transmission TDD slot may be allocated before the second transmission TDD slot.

The SP may include a first TDD interval and a second TDD interval, the first transmission TDD slot and the first reception TDD slot may be included in the first TDD interval, and the second transmission TDD slot and the second reception TDD slot may be included in the second TDD interval.

What is claimed is:

1. A method in a wireless local area network (WLAN) system, the method comprising:
   transmitting, by a first station (STA), a first MAC Protocol Data Unit (MPDU) to a second STA in a first transmission TDD slot; and
   receiving, by the first STA, a first acknowledgement (ACK) frame of the first MPDU from the second STA in a first reception TDD slot,
   wherein the first MPDU and the first ACK frame are transmitted and received in a service period (SP) based on time division duplex (TDD),
   the SP comprises the first transmission TDD slot and the first reception TDD slot, and
   a second MPDU that has an ACK policy of a normal ACK frame is not transmitted in the first transmission TDD slot until the first ACK frame is received.

2. The method of claim 1, further comprising:
   transmitting, by the first STA, a plurality of MAC protocol data unit (MPDUs) to the second STA in a second transmission TDD slot,
   receiving, by the first STA, a second ACK frame of the plurality of MPDUs from the second STA in a second reception TDD slot,
   wherein the plurality of MPDUs and the second ACK frame are transmitted and received in the SP based on the TDD,
   the SP further comprises the second transmission TDD slot and the second reception TDD slot,
   each of the plurality of MPDUs is an aggregated-MPDU (A-MPDU),
   the first MPDU is a single MPDU,
   the second ACK frame is a block acknowledgement (BA) frame including information on whether each of the plurality of MPDUs is successfully received, and
   the first ACK frame is the normal ACK frame.

3. The method of claim 2, wherein a last MPDU among the plurality of MPDUs comprises a block ACK request (BAR).

4. The method of claim 3, wherein the last MPDU is not transmitted in a last TDD slot of the second transmission TDD slot.

5. The method of claim 2, wherein each of the plurality of MPDUs is a single MPDU, and the first MPDU is an aggregated-MPDU (A-MPDU).

6. The method of claim 5, wherein a last MPDU among the plurality of MPDUs comprises a normal ACK request (NAR).

7. The method of claim 6, wherein the last MPDU is not transmitted in a last TDD slot of the second transmission TDD slot.

8. The method of claim 2, wherein the first reception TDD slot is allocated after the first transmission TDD slot, and
the second reception TDD slot is allocated after the second transmission TDD slot.

9. The method of claim 2, wherein the first transmission TDD slot is allocated before the first second transmission TDD slot.

10. The method of claim 2, wherein the SP comprises a first TDD interval and a second TDD interval,
the first transmission TDD slot and the first reception TDD slot are comprised in the first TDD interval, and
the second transmission TDD slot and the second reception TDD slot are comprised in the second TDD interval.

11. A first station (STA) in a wireless local area network (WLAN) system, the first STA comprising:
a memory;
a transceiver; and
a processor operatively connected with the memory and the transceiver,
wherein the processor is configured to:
transmit a first MAC Protocol Data Unit (MPDU) to a second STA in a first transmission TDD slot, and
receive a first acknowledgement (ACK) frame of the first MPDU from the second STA in a first reception TDD slot, and
wherein the first MPDU and the first ACK frame are transmitted and received in a service period (SP) based on time division duplex (TDD),
the SP comprises the first transmission TDD slots and the first reception TDD slots, and
a second MPDU that has an ACK policy of a normal ACK frame is not transmitted in the first transmission TDD slot until the first ACK frame is received.

12. The first STA of claim 11, wherein the processor is further configured to:
transmit a plurality of MAC protocol data unit (MPDUs) to the second STA in a second transmission TDD slot,
receive a second ACK frame of the plurality of MPDUs from the second STA in a second reception TDD slot,
wherein the plurality of MPDUs and the second ACK frame are transmitted and received in the SP based on the TDD,
the SP further comprises the second transmission TDD slot and the second reception TDD slot,
each of the plurality of MPDUs is an aggregated-MPDU (A-MPDU),
the first MPDU is a single MPDU,
the second ACK frame is a block acknowledgement (BA) frame including information on whether each of the plurality of MPDUs is successfully received, and
the first ACK frame is the normal ACK frame.

13. The first STA of claim 12, wherein a last MPDU among the plurality of MPDUs comprises a block ACK request (BAR).

14. The first STA of claim 13, wherein the last MPDU is not transmitted in a last TDD slot of the second transmission TDD slot.

15. The first STA of claim 12, wherein each of the plurality of MPDUs is a single MPDU, and
the first MPDU is an aggregated-MPDU (A-MPDU).

16. The first STA of claim 15, wherein a last MPDU among the plurality of MPDUs comprises a normal ACK request (NAR).

17. The first STA of claim 16, wherein the last MPDU is not transmitted in a last TDD slot of the second transmission TDD slot.

18. The first STA of claim 12, wherein the first reception TDD slot is allocated after the first transmission TDD slot, and
the second reception TDD slot is allocated after the second transmission TDD slot.

19. The first STA of claim 12, wherein the second first transmission TDD slot is allocated before the first second transmission TDD slot.

20. A method in a wireless local area network (WLAN) system, the method comprising:
receiving, by a first station (STA), a first MAC Protocol Data Unit (MPDU) from a second STA in a first transmission TDD slot; and
transmitting, by the first STA, a first acknowledgement (ACK) frame of the first MPDU to the second STA in a first reception TDD slot,
wherein the first MPDU and the first ACK frame are transmitted and received in a service period (SP) based on time division duplex (TDD),
the SP comprises the first transmission TDD slots and the first reception TDD slots, and
a second MPDU that has an ACK policy of a normal ACK frame is not transmitted in the first transmission TDD slot until the first ACK frame is received.

* * * * *